3,546,581
INSULATION CONTINUITY TESTER INCLUDING A GROUNDED DETECTOR RESISTANCE AND GROUNDED VOLTAGE SOURCE
Jerry L. Herrendeen, Muskegon, and Norman W. Halverson, Grand Haven, Mich., assignors to Anaconda Wire and Cable Company
Filed Mar. 2, 1967, Ser. No. 620,053
Int. Cl. G01r 31/02
U.S. Cl. 324—54                                    6 Claims

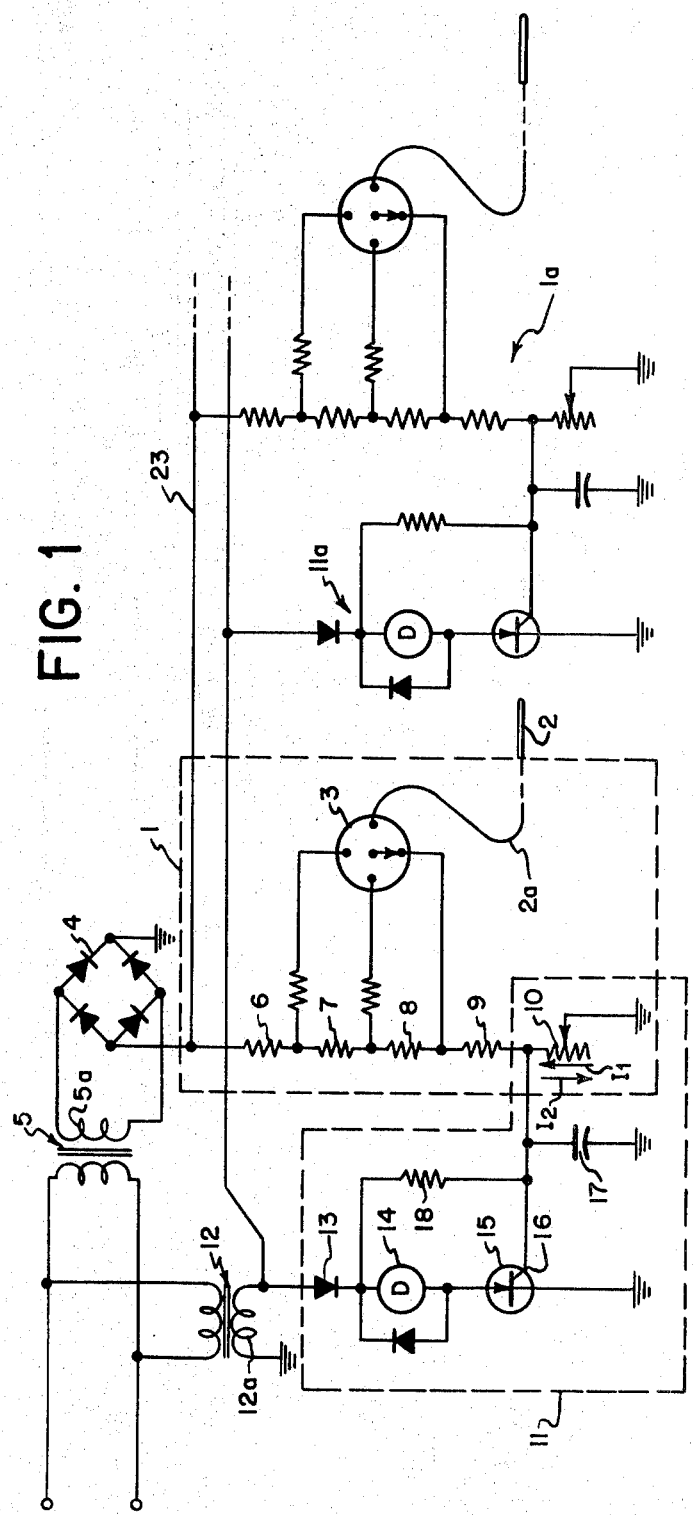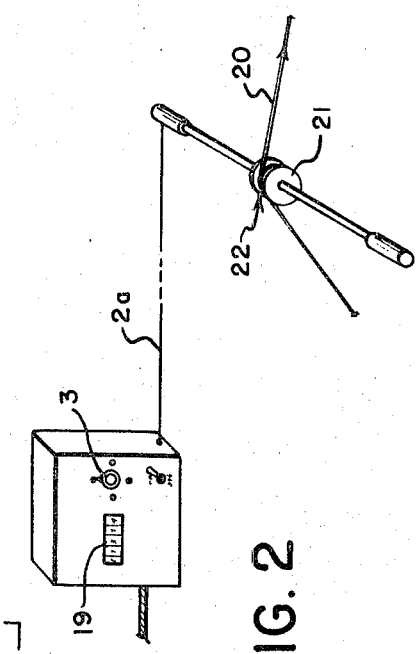
INVENTORS.
JERRY L. HERRENDEEN
NORMAN W. HALVERSON

United States Patent Office 3,546,581
Patented Dec. 8, 1970

ABSTRACT OF THE DISCLOSURE

An insulation fault detector is provided such that it can detect any flaws which exceed a preset threshold magnitude affecting the insulation properties of the test material. The detector includes a first circuit including at least a portion of the insulation, and a probe located in the vicinity of the insulation which is connected in circuit with a grounded detector resistance and a grounded voltage source; a second circuit is provided including a fault indicator and threshold means capable of activating the fault indicator when the voltage across the detector exceeds a predetermined voltage threshold. This detector allows accurate detection of insulation faults while permitting a plurality of such detectors to be connected in parallel to a common energy source.

BACKGROUND OF THE INVENTION

Field of the invention

In the production of electrically insulated conductors, the continuity of the insulation may be tested by impressing a localized voltage across the insulating layer and measuring the resultant current flow through the insulating layer. The presence of voids, imperfections and other local aberrations affects the impedance of the insulating layer and consequently varies the current that can flow through it. Any layer of material which is an insulator may be tested in this manner.

Description of the prior art

Various devices are known for testing the continuity of insulating layers. Certain of such devices include a high voltage source connected to a probe, which is placed close to the insulating layer to be tested. Sufficient voltage is applied to such probe to produce an ionized blanket of air about the object to be tested in the vicinity of the probe. The conductive path formed by this ionized region, or by actual contact between the probe and the insulation, becomes part of an electrical circuit, in series with which is the impedance of a localized portion of the insulation to be tested.

The presence of voids and other imperfections which it is desired to detect cause variations in the electrical impedance of the insulating layer and, consequently, variations in the current flow through that impedance, other parameters being held substantially constant. A detector resistor is placed in series with the power supply for the probe, so that the voltage across it is indicative of current flow through the insulation. Variations in that voltage are taken as indications of the presence of imperfections in the insulation.

In testers of this type, it has not heretofore been possible to connect more than a single probe to a power supply. The reason for this difficulty, which is a material economic impediment, is that the detector resistor has to be placed between the low side of the high-voltage transformer and ground. Therefore the detector resistors corresponding to all probes connected to a common power supply are placed in parallel, making it impossible to correlate the signal on a given detector resistor with a particular probe. If the detector resistor were placed between the high side of the high-voltage transformer and the probe, then the detector for detecting the voltage across the detector resistor would have to be floating, leading to other problems. Finally, the detector resistor cannot be connected between the probe and ground, because it is standard practice to test insulation directly after the wire has been insulated and before it is wound on drums for shipment. Thus the environment in which continuity testing is carried out ordinarily requires that the wire conductor being insulated be at ground potential. Since the detector resistor cannot be placed between the insulation and the wire (which forms the return path in the test circuit), it cannot be placed between the probe and ground. The stability of such devices has moreover left something to be desired, in part because it has been impossible to use a common power supply for multiple test units so that any variation among the power supplies decreases the probability of obtaining consistent measurements.

SUMMARY OF THE INVENTION

This invention is based on the discovery of an improved insulation fault detector operating on the principle of balancing two voltage sources of opposite polarity, and allowing the presence of a fault to upset that balance. In a desirable embodiment of the device, two circuits are provided with an impedance common to both, one of which contains a threshold type detector, and the other of which is a high voltage test circuit. A particularly advantageous embodiment of the invention utilizes a silicon controlled rectifier to detect a predetermined degree of imbalance between the opposing voltage sources, which imbalance causes the silicon controlled rectifier to change state, thereby indicating the presence of fault.

BRIEF DESCRIPTION OF THE DRAWINGS

The invention will be described in conjunction with the accompanying drawings, in which:

FIG. 1 is a schematic circuit diagram of an embodiment of the invention; and

FIG. 2 is a schematic illustration of a test apparatus embodying the invention.

DESCRIPTION OF THE PREFERRED EMBODIMENTS

As illustrated in the embodiment of FIG. 1, a high voltage test circuit 1 is provided which includes a probe 2 connectable through a multi-position switch 3 to a full wave rectifier 4. The input to the full wave rectifier 4 is provided by a high voltage transformer 5, the secondary winding 5a of which has an output voltage on the order of a few thousand volts. The output of the rectifier 4 is applied across a series of resistors 6, 7, 8 and 9, which control the voltage applied to be probe 2, depending on the particular point to which the probe 2 is connected by means of the multi-position switch 3.

In series with the resistors 6 through 9 is a variable resistor 10, one side of which is grounded. Also shown in FIG. 1 is a detector circuit 11 which may conveniently operate at a substantially lower voltage than does the test circuit 1. Power is supplied to the detector circuit 11 by a transformer 12, one side of the secondary winding 12a of which is grounded. The other side of the secondary winding 12a is connected through a diode 13, a fault detector 14 and a silicon controlled rectifier 15 to ground. The control terminal 16 of the silicon controlled rectifier is connected to the variable resistor 10, so that the latter element is included in the detector circuit 11, and is thus common to both the test circuit 1 and the detector circuit 11. A capacitor 17 is connected in parallel with the variable resistance 10, and a resistor 18 is connected from between the diode 13 and the fault detector 14 to the control terminal 16 of the silicon controlled rectifier 15.

The device operates by causing two currents of opposite sense to flow in the variable resistor 10 which is common to both the test circuit 1 and the detector circuit 11. Considering the test circuit alone, the rectifier 4 generates a current $I_1$ in the resistor 10 in the direction indicated. Considering the detector circuit 11 alone, the transformer 12 generates a current $I_2$ in the resistor 10 in the direction indicated. Because of the smoothing provided by the capacitor 17, $I_2$ is a substantially constant current. The net, or difference, current of $I_1$ and $I_2$ determines the voltage at the control terminal 16 of the silicon controlled rectifier 15. If $I_2$ is increased sufficiently, or alternatively if $I_1$ is decreased sufficiently, the voltage at control terminal 16 will rise and cause the silicon controlled rectifier 15 to conduct, thereby actuating the fault detector 14. The fault detector 14 may be connected to actuate a counter 19 as shown in FIG. 2.

FIG. 2 illustrates how the apparatus of FIG. 1 may be used to test the insulation on a wire conductor. The insulated conductor 20 is run about an electrically conductive sheave 21 forming an arc of contact 22 therewith. Any other form of conductive probe may be used, depending primarily upon the geometry of the insulation under test. Sufficiently high voltage is applied to the conductive sheave 21 (through a brush or equivalent means) to ionize the air immediately surrounding a portion of the insulation on conductor 20 as it passes over the sheave 21. One end of the conductor 20 must be connected to ground, so that a circuit is created through the switch 3, the probe lead 2a, the sheave 21, the localized portion of insulation near the arc of contact 22, the conductor 20, to ground. A low level current will flow in the last-mentioned circuit, and the magnitude of such current will depend upon the impedance of that portion of the insulation of conductor 20 in the vicinity of the arc of contact 22. If the impedance of the insulation decreases due to the presence of a pin hole, blister or any other kind of discontinuity in the insulation, the current through the sheave 21 will increase, thereby increasing the voltage drop across resistor 6 and any of resistors 7 and 8 which are also in series with the sheave 21. Consequently the current $I_1$ will decrease, thereby positively increasing the net voltage at the control electrode 16. Thus, if sufficient fault current flows through the sheave 21 the silicon controlled rectifier 15 will be turned on and will indicate the presence of a fault. Apparatus (not shown) may be provided for correlating the indication of a fault with the exact point on the conductor 20 at which it occurs.

The fault to be detected must remain in a position to cause fault current flow through the probe for at least the minimum time necessary to actuate the fault detector 14, which is usually a relay. It is this minimum time which determines the length of the arc of contact 22. It has been found that the smallest fault to be detected should remain in a position to actuate the detector 14 for a time on the order of $\frac{1}{20}$ second, for good results.

The sensitivity of the tester is determined by the incremental voltage necessary to turn on the silicon controlled rectifier 15. This voltage is the difference between the turn-on potential of the rectifier and the residual voltage across the variable resistance 10 due to $I_1$ and $I_2$ therethrough in the absence of a fault. Because the variable resistance 10 is a different percentage of the total resistance in series with it in each of the circuits 1 and 11, the last-mentioned residual voltage can be varied by adjusting the resistance 10, thereby adjusting the sensitivity of the tester. Increasing the value of the resistance 10 will tend to increase the sensitivity of the tester.

The tester may be used to test the continuity of any layer of insulating material which has or can be provided with an adjacent conducting layer. It will be apparent that a multiplicity of units can be connected in parallel with that shown, further test circuits (e.g. circuit 1a) being connected to the lead 23 in parallel with test circuit 1 and further detection circuits (e.g. detection circuit 11a) being connected to the lead 24, in parallel with the detection circuit 11. The two secondary windings 5a and 12a may derive power from a common primary winding. The tester is highly accurate and sensitive enough to detect impedance variations of less than an order of magnitude.

It will be apparent that the invention is not limited to the specific features in the above-described preferred embodiment and that various modifications may be made without departing from its scope as defined in the claims.

We claim:

1. A continuity tester for detecting insulation faults, comprising:
    means capable of forming a first circuit including at least a portion of such insulation, said means including a probe disposable in the vicinity of said portion of such insulation, a ground terminal disposed such that current through such insulation flows between the probe and said ground terminal, a detector resistance connected in parallel with the probe and ground terminal such that one side of said detector resistance is connected to ground potential and the other side of said detector resistance is connected to the probe, and a voltage source connected in said first circuit to provide sufficient voltage between the probe and said portion of such insulation to generate a current in the detector resistance dependent on the impedance of said portion of such insulation; and
    means forming a second circuit, including a fault indicator and threshold means defining a voltage threshold, said threshold means being responsive to the voltage across the detector resistance and connected to actuate said fault indicator when the voltage across the detector resistance crosses the voltage threshold.

2. A continuity tester for detecting insulation faults, comprising:
    means capable of forming a first circuit including at least a portion of such insulation, said means including a probe disposable in the vicinity of said portion of such insulation, a detector resistance, one side of which is connected to ground potential, and a first voltage source for providing sufficient voltage between the probe and said portion of such insulation to generate a first current through the detector resistance dependent upon the impedance of said portion of such insulation, one side of said voltage source being connected to ground potential; and
    means forming a second circuit including said detector resistance, a second voltage source for providing a second current opposite in sense from said first current through said detector resistance, a fault indicator, and threshold means defining a voltage threshold and responsive to the voltage across said detector resistance for actuating the fault indicator when the sum of the voltages due to the first and second currents through the detector resistance crosses the voltage threshold.

3. A continuity tester for detecting insulation faults as defined in claim 2 wherein said detector resistance is variable and is a different percentage of the total resistance in series with it in the means forming a first circuit than in the means forming a second circuit, whereby the voltage across the detector resistance may be varied by adjusting the detector resistance to change the sensitivity of the detector.

4. A continuity tester for detecting insulation faults as defined in claim 3 wherein said threshold means is a silicon controlled rectifier.

5. A continuity tester for detecting insulation faults as defined in claim 4 wherein said first and second voltage sources include secondary transformer windings for deriving power from a common primary winding.

6. A continuity tester for detecting insulation faults as defined in claim 2 for detecting faults in the insulation of magnet wire, wherein said probe is a conductive sheave over which the magnet wire may be drawn, said magnet wire insulation forming an arc of contact with the sheave, said first voltage source providing sufficient voltage to ionize the atmosphere surrounding the wire and adjacent the sheave so that faults at any point on the perimeter of the wire about the arc of contact may be detected.

References Cited

UNITED STATES PATENTS

| | | | |
|---|---|---|---|
| 2,809,348 | 10/1957 | Kellogg et al. | 324—54 |
| 3,321,703 | 5/1967 | Tyszewicz | 324—54 |
| 3,339,136 | 8/1967 | Rasor et al. | 324—54 |
| 3,356,939 | 12/1967 | Stevenson | 324—51 |
| 2,941,144 | 6/1960 | Cannon | 324—54 |
| 2,942,248 | 6/1960 | Huggins | 324—54XR |
| 3,063,008 | 11/1962 | Grady | 324—54UXR |
| 3,096,478 | 7/1963 | Brown | 324—54 |
| 3,141,128 | 7/1964 | Behr | 324—51 |
| 3,277,364 | 10/1966 | Abrahamson | 324—54 |

FOREIGN PATENTS

| | | | |
|---|---|---|---|
| 165,773 | 4/1950 | Austria | 324—54 |
| 1,430,990 | 1/1966 | France | 324—54 |

GERARD R. STRECKER, Primary Examiner

U.S. Cl. X.R.

324—51